United States Patent
Thompson et al.

[11] Patent Number: 6,159,631
[45] Date of Patent: Dec. 12, 2000

[54] OVERCHARGE SAFETY VENTS ON PRISMATIC CELLS

[75] Inventors: Sean Thompson; Frank L. Martucci, both of Dublin, Calif.

[73] Assignee: Polystor Corporation, Dublin, Calif.

[21] Appl. No.: 09/141,766

[22] Filed: Aug. 27, 1998

[51] Int. Cl.[7] .................................................. H01M 2/12
[52] U.S. Cl. .................. 429/82; 429/53; 429/56; 429/72; 220/89.1; 220/89.2; 220/207; 220/367; 222/397
[58] Field of Search ...................... 429/82, 53, 56, 429/94, 72; 220/89.1, 207, 89.2, 367; 222/397

[56] References Cited

U.S. PATENT DOCUMENTS

| | | | |
|---|---|---|---|
| 4,430,382 | 2/1984 | Kelley et al. | 429/53 |
| 4,482,613 | 11/1984 | Turchan et al. | 429/53 |
| 4,610,370 | 9/1986 | Patterson et al. | 220/207 |
| 4,698,282 | 10/1987 | Mantello | 429/56 |
| 4,789,608 | 12/1988 | Oswald | 429/53 |
| 4,803,136 | 2/1989 | Bowsky et al. | 429/56 |
| 4,965,149 | 10/1990 | Ashihara et al. | 429/168 |
| 4,993,602 | 2/1991 | Casey | 222/396 |
| 5,004,656 | 4/1991 | Sato et al. | 429/162 |
| 5,042,675 | 8/1991 | Patterson | 220/89.1 |
| 5,279,907 | 1/1994 | Paterek et al. | 429/56 |
| 5,458,988 | 10/1995 | Putt | 429/27 |
| 5,554,455 | 9/1996 | Inoue et al. | 429/53 |
| 5,609,972 | 3/1997 | Kaschmitter et al. | 429/56 |
| 5,677,076 | 10/1997 | Sato et al. | 429/56 |
| 5,688,612 | 11/1997 | Mrotek et al. | 429/89 |
| 5,827,621 | 10/1998 | Morishita et al. | 429/176 |

*Primary Examiner*—Maria Nuzzolillo
*Assistant Examiner*—Angela J. Martin
*Attorney, Agent, or Firm*—Beyer Weaver & Thomas LLP

[57] ABSTRACT

Disclosed are safe, easy to manufacture prismatic cells having scored regions strategically located on portions of the prismatic cell can or cell header. When they are located on the cell can, the scored regions are provided on the side of the can, rather than on the bottom of the can as in other designs. The scored region may be located on a corner of one side of the side of the cell can. Scored regions so located tend to release excess pressure over a relatively narrow and easier to control pressure range. Similar benefits can be obtained by placing the scored region on a "dished" header of a prismatic cell. Such dished header designs have a vertical lip around the perimeter of a substantially flat horizontal portion. The scoring may be provided near one of the ends of the header's substantially flat portion.

19 Claims, 9 Drawing Sheets

| Set Num. | Num. Samples | SCORE TYPE | HEADER TYPE | LOCATION OF SCORE ON HEADER | MATERIAL | HEADER THICK (IN.) | SCORE THICK (IN.) | BURST PRES. (AVE. PSI) |
|---|---|---|---|---|---|---|---|---|
| 1 | 2 | DOG BONE | FLAT HEADER | SIDE | S. STEEL | 0.020 | 0.00150 | 1265 |
| 2 | 2 | DOG BONE | FLAT HEADER | SIDE | S. STEEL | 0.020 | 0.00200 | 1350 |
| 3 | 4 | DOG BONE | DISHED HEADER | SIDE | S. STEEL | 0.020 | 0.00150 | 500 |
| 4 | 5 | DOG BONE | DISHED HEADER | SIDE | S. STEEL | 0.020 | 0.00230 | 800 |

Figure 8A

| Set Num. | Num. Samples | SCORE TYPE | HEADER TYPE | LOCATION OF SCORE ON HEADER | MATERIAL | HEADER OR CAN THICK (IN.) | SCORE THICK (IN.) | BURST PRES. (AVE. PSI) |
|---|---|---|---|---|---|---|---|---|
| 1 | 4 | DOG BONE | DISHED HEADER | SIDE | S. STEEL | 0.020 | 0.00150 | 500 |
| 2 | 5 | DOG BONE | DISHED HEADER | SIDE | C. STEEL | 0.020 | 0.00150 | 355 |

Figure 8B

OVERCHARGE SAFETY VENTS ON PRISMATIC CELLS

BACKGROUND OF THE INVENTION

This invention relates to prismatic batteries, and more particularly to safety vents for prismatic battery containers.

Of particular interest in the context of the present invention are rechargeable lithium-ion cells, although other cell types may also benefit from described safety vents. Because of the large amounts of energy stored in lithium ion cells and because of the potentially hazardous nature of some cell components, there is a risk of explosion or uncontrolled release of cell electrolyte.

Lithium-ion cells may operate at pressures in the range of 5–25 pounds per square inch (psi). Such pressures are produced by gases generated during the cell's formation cycle and operation. Cell containers, which are normally made from steel, aluminum or other metal, are designed to contain cell contents at such pressures. Higher pressures can result from overcharging due to a faulty charger, external or internal cell shorting, exposure to excessive heat (e.g., fire), etc. Thus, lithium-ion cell housings should also include some mechanism for controlling the build-up of excess internal pressure. Various safety mechanisms have been devised. One such mechanism is a scored region or vent or reduced material thickness on the cell container. When the cell experiences excess internal pressure the scored region, having relatively low pressure resistance, will rupture and release excess pressure in a controlled manner.

Cell containers come in various sizes and shapes depending upon energy and power requirements as well as the compartment in which the cell will be housed. Cylindrical and prismatic cells are now widely used, although cylindrical cells are more common. Cylindrical cell containers typically have two components: a large cylindrical can and a positive terminal cap. Vents have been provided on both the cylindrical cell can as well as the cap.

Prismatic batteries come in many sizes and geometries, but all have three principal dimensions. Note that cylindrical cells have only two principal dimensions: a length and a diameter. Often, prismatic cells are rectangular in shape. Due to their different shape and construction, prismatic cells and cylindrical cells have different safety design considerations.

Generally lithium ion prismatic cell containers have a large cell can and smaller cell "header." The header portion often contains the terminal for the positive electrode of the prismatic cell, while the can itself serves as the negative terminal and houses the anode, cathode, and electrolyte. In some designs (e.g., those employing aluminum cans), the terminals are reversed. Often the can is a five-sided box structure. Like their cylindrical counterparts, some prismatic cells include safety vents or scoring to release pressure in a controlled manner. For example, one prismatic cell provided by Toshiba Corporation of Japan includes a "dog bone" shaped scored region on the bottom center portion of the prismatic cell can. A different prismatic cell available from Sony Corporation of Japan includes a circular scored region on the "header" portion of the prismatic cell container. The Sony prismatic cell employs a substantially flat header with a slight indentation near its center.

While these designs provide some measure of safety for prismatic cells, they do not appear to have been designed to address certain structural features of prismatic cells. For example, improved designs could be provided in which the manufacture of the vent is made more simply and the vent bursts at a narrowly tailored pressured range.

SUMMARY OF THE INVENTION

The present invention advances the state-of-the-art by providing safe, easy to manufacture prismatic cells having scored regions strategically located on portions of the prismatic cell can or cell header. When they are located on the cell can, they are provided on the side of the can, rather than on the bottom of the can as in prior designs. Preferably, the scored region is located on a corner of the side of the cell can. Scored regions so located tend to release excess pressure over a narrower and easier to control pressure range in comparison to other designs. Similar benefits can be obtained by placing the scored region on a "dished" header of a prismatic cell. Such dished header designs have a vertical lip around the perimeter of a substantially flat horizontal portion. The scoring may be provided in region of the header's substantially flat portion where significant deflection occurs. Such region may be at the middle of the header or near one of its ends.

One aspect of the invention is a prismatic header. Such header may be characterized by the following features: (a) a dished header body having a substantially flat inner portion and a lip about the perimeter of the header body and (b) a scored region on the inner portion of the dished header body, which scored region can rupture when exposed to a predefined burst pressure within the prismatic cell container. Note that the header body is configured to attach to a prismatic cell can to thereby form a prismatic cell container. The header may include other features such as an aperture for receiving a battery terminal and an electrolyte fill port.

To match the shape of the prismatic cell can, the dished header body generally will have a longer dimension and a shorter dimension. Often the dished header body will be substantially rectangular shaped. In one embodiment, the scored region is located proximate an edge of the dished header body on the longer dimension.

Another aspect of the invention is a prismatic cell can that may be characterized as including the following features: (a) a cell can body having a bottom portion and a circumferential side portion having a principal dimension provided on a principal axis and a secondary dimension provided on a secondary axis; and (b) a scored region of reduced material thickness on the circumferential side portion of the cell can body. Sometimes, the cell can body has multiple scored regions. In many cases, one axis will be longer than the other (e.g., the principal axis will be longer than the secondary axis). For example, the circumferential side portion may be rectangular or oval-shaped. When this is the case, the scored region is preferably located on a principal side which is substantially parallel to the principal axis (the longer axis) of the circumferential side portion. The principal side may be a substantially flat side having corners. In such case, the scored region preferably is located proximate one of these corners. Regardless of the exact location of the scoring on the circumferential side portion, the scored region preferably occupies not more than about 30% of the area of the substantially flat side.

The header and/or cell can may be constructed from a metal or other material of sufficient strength and compatibility with the potentials and electrochemical environment of the cell. Exemplary materials of construction include steel, stainless steel, aluminum, and aluminum alloys. Sometimes, the container components will be constructed from a metal having a corrosion resistant plating (e.g., a nickel plating).

The scored region of the header or can may take on many different shapes. In preferred embodiments, the shape is circular, oval, or dog bone shaped. In order to consistently rupture at a suitable burst pressure, the scoring should be sufficiently deep to leave a fixed thickness of metal in the header. This thickness is referred to herein as the "remaining thickness." In a preferred embodiment, the scored region has a remaining thickness in a header body of between about 4% and 30% of the unscored material thickness. More preferably, the scored region has a remaining thickness in a header body of between about 4% and 25% of the unscored material thickness. The scored region will also have a linear width measured on the surface of the cell container. In a specific embodiment, the scored region has a scoring width of between about 0.1 and 0.3 millimeters.

Yet another aspect of the invention provides a method of venting a prismatic battery having the construction described above. The method may be characterized as follows: (i) exposing the prismatic battery to conditions whereby pressure within the prismatic cell container reaches a predefined burst pressure and (ii) releasing some of said pressure by rupturing the scoring on at least one of the cell can and the dished header. Preferably, the predefined burst pressure is at least about 200 psi (more preferably at least about 400 psi).

These and other advantages of the present invention will become apparent to those skilled in the art upon a reading of the following descriptions of the invention and a study of the several figures of the drawing.

BRIEF DESCRIPTION OF THE DRAWINGS

FIG. 8A provides a table of experimental vent pressure results for tests conducted on scored prismatic cell headers and illustrating different performance for flat and dished headers.

FIG. 8B provides a table of experimental vent pressure results for tests conducted on scored prismatic cell headers and illustrating different vent pressures for stainless and carbon steels.

DETAILED DESCRIPTION OF THE PREFERRED EMBODIMENTS

This invention relates to prismatic cells and more particularly to prismatic cell containers having scored regions for safe controlled release of excess internal pressure. Prismatic cells are those cells having at least three dimensions. Conventional cylindrical cells are not considered prismatic. They have only a length and a diameter. Generally, a prismatic cell will have a top, a bottom, and a circumferential side wall which may include three or more sides. The four-sided version is in common use. Frequently, some sides are larger than other sides. One common design employs four rectangular sides in which adjacent sides are substantially perpendicular to one another. In this design, two of the parallel sides are substantially larger than the other two parallel sides. Another design under development is the oval prismatic cell having one continuous circumferential side. While this design does not have well defined corners, its circumferential side has two dimensions defining its shape; one of these dimensions is larger than the other. Note that, in general, the prismatic cell cans of this invention have a principal dimension that is larger than a secondary dimension. This is distinguishable from the case of a cylindrical cell where the principal and secondary dimension are both the cell can diameter.

Figure 1A:
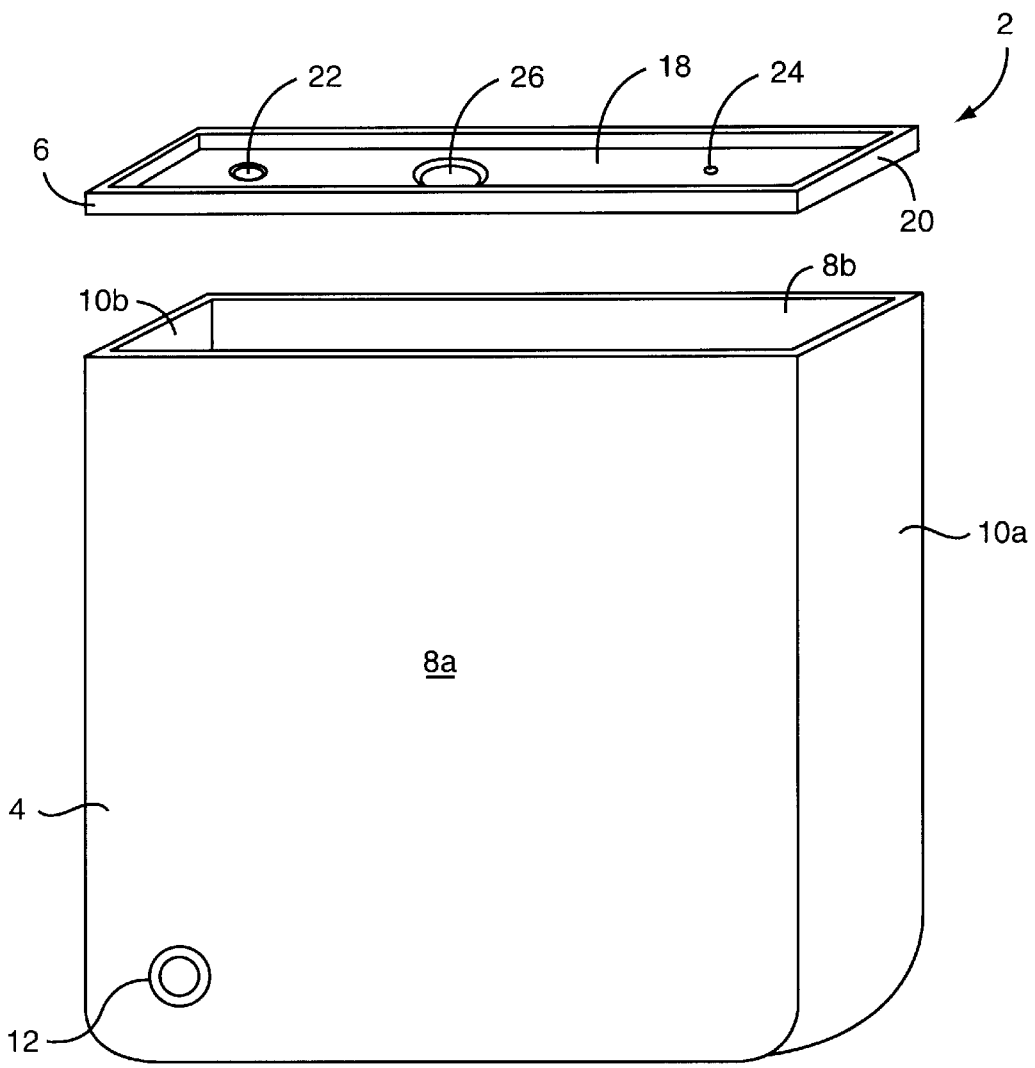
FIG. 1A is a perspective drawing of a prismatic cell container of the present invention including scoring on a principal side wall of a cell can and on a dished header of the cell can.
Figure 1B:
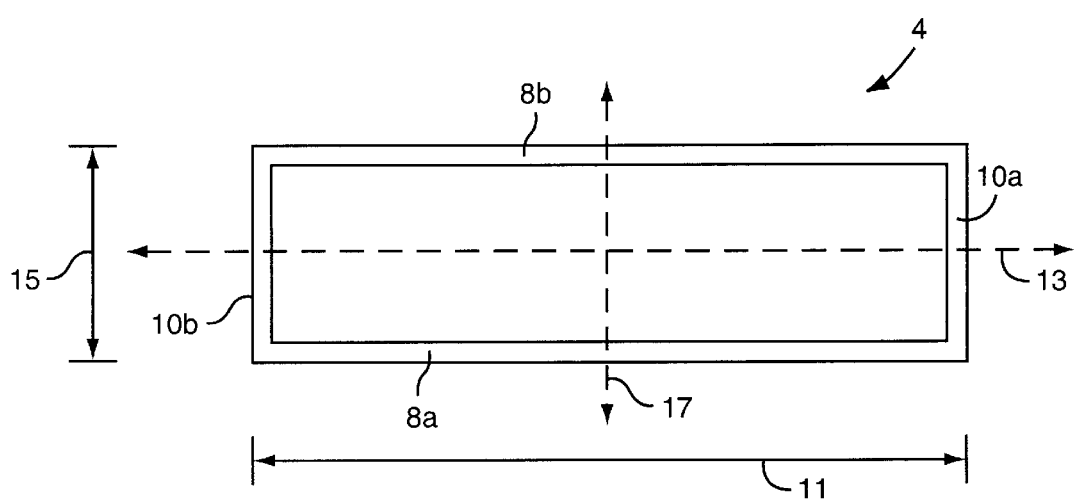
FIG. 1B is a top view of the prismatic cell can depicted in FIG. 1A.

FIGS. 1A and 1B show a prismatic cell container 2 of the type used with common rectangular prismatic cells. Container 2 includes two primary components: a prismatic cell can 4 and a prismatic cell header 6. Prismatic cell can 4 includes two principal sides 8a and 8b. It also includes two secondary sides, 10a and 10b. As illustrated in FIG. 1B (top view), the width of principal sides 8a and 8b is given by a "principal dimension" 11 on a principal axis 13. The width of secondary sides 10a and 10b is given by a "secondary dimension" 15 on a secondary axis 17.

Proximate the bottom left side of principal surface 8a, is a circular scored region 12. This is a circularly shaped region of reduced material thickness in the wall of principal side 8a. Because it has reduced thickness, the scored region will tear or break at a pressure below that necessary to tear or break other portions of prismatic cell can 4.

Figure 2:
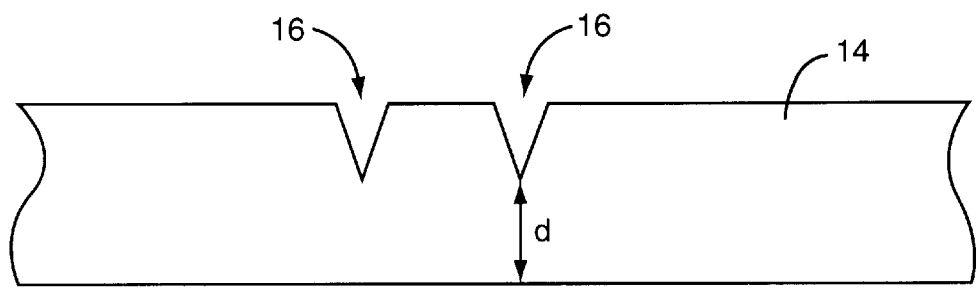
FIG. 2 is a cross section of a scored region of a prismatic cell container in accordance with this invention.

FIG. 2 shows in cross section, a scored portion of a prismatic cell container. Specifically, though not necessarily, the cell container is made of metal. As shown, a prismatic cell container section 14 includes two triangularly shaped indentations 16 associated with a scored region such as circular scored region 12. One key feature in determining the burst pressure of a scored region is the thickness of metal remaining beneath the deepest extent of the scored region. In FIG. 2, this "remaining thickness" is given by the dimension "d."

It should be understood that the cross-sectional shape of scored region indentations need not be triangular as shown in FIG. 2. Depending upon the application and the tool employed to make the scored region, the indentations may be triangular, rectangular, U-shaped, or any of a number of shapes. In a specific embodiment, the angle at the bottom of a triangularly-shaped scored region is about 60 degrees.

Returning now to FIG. 1A, the header portion 6 is shown having a substantially flat rectangular body portion 18 and a lip 20 about the perimeter of the body portion. Prismatic cell header 6 is sized and shaped to fit on or into the top of prismatic cell can 4.

During assembly, prismatic cell can 4 accepts the electrochemically active components of a battery cell. In one embodiment, these components are provided as wound sheets of anode, separator and cathode. Such wound structures are sometimes referred to a "jellyrolls." After the active materials are inserted into prismatic cell can 4, prismatic cell header 6 is fitted onto the top of the can and then tightly sealed to prevent the active materials from leaking.

In the embodiment shown, prismatic cell header 6 includes an orifice 22 through which one of the cell terminals extends. Typically, the positive terminal extends through orifice 22 and the can itself serves as the negative terminal.

Prismatic cell header 6 also may include an electrolyte fill hole 24. This may be employed in some jellyroll designs to introduce electrolyte into the interior of prismatic cell can 4 after the anode, cathode and separator have been inserted.

Finally, prismatic cell header 6 includes a circular scored region 26 for the controlled release of excess internal pressure. Preferably, though not necessarily, scored region 26 may be of the same size, shape, depth and configuration as circular scored region 12 in the prismatic cell can 4. Of course, it is not entirely necessary that prismatic cell container 2 include two separate scored regions. For many applications, one vent (scored region) may suffice. Alternatively, more than two scored regions may be provided on cell container 2. Preferably, such scored regions are located either on the dish-shaped header or on a circumferential side of the cell can (as opposed to being located on the bottom of the cell can).

Figure 3A:
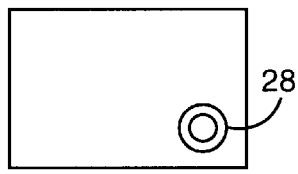
FIGS. 3A–3H show various shapes of scored regions that may be employed with the present invention.
Figure 3E:
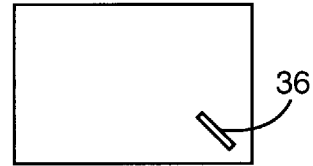
Figure 3B:
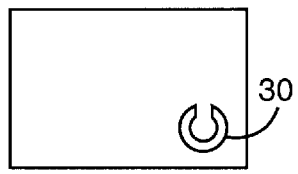
Figure 3F:
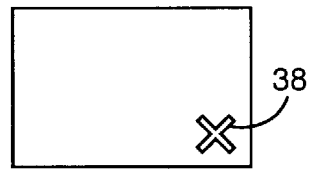
Figure 3C:
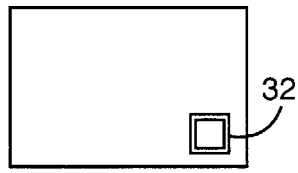
Figure 3G:
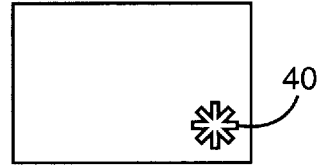
Figure 3D:
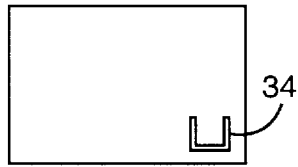

FIGS. 3A–3H show eight possible scored region shapes. Other shapes may also be useful. These examples simply serve to illustrate some of the range of acceptable shapes that may be employed. FIG. 3A shows a circular scored region 28 as illustrated in FIG. 1A. FIG. 3B shows a "C-shaped" scored region 30. Region 30 will burst as a semi-circular flap. FIG. 3C illustrates a square or rectangular shaped scored region 32. FIG. 3D shows a rectangular flap scored region 34. Like C-shaped region 30, region 34 is designed to burst as a flap. FIG. 3E shows a linear scored region 36. Note that the orientation of this and the other scored regions illustrated in this set of figures could be modified. For example, scored region 36 could be rotated by 90 degrees. FIG. 3F shows an "X-shaped" scored region 38. FIG. 3G shows a star-shaped scored region 40. Finally, 3H shows a "dog bone" shaped region 42.

Figure 3H:
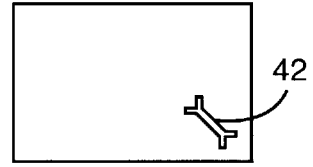

Among the most common and easy to manufacture scored shapes are the circular shape as shown in FIG. 3A and the dog bone shape as shown in FIG. 3H. These and similar shapes exhibit good control over burst properties. The circular shape has been found to be somewhat easier to manufacture than the dog bone shape, though the dog bone shape may still be preferred for certain applications.

It has been found that placing the scored regions along one of the diagonals bisecting a principal side of a prismatic cell can has certain advantages. For example, the burst pressure is easier to control and the range of burst pressures may be narrowly tailored. One wants to make the scoring sufficiently thin that venting occurs at a safe pressure. However, as the remaining thickness decreases, small pinhole leaks may occur at very low pressures (e.g., 1–5 psi) due to cracking in the material. In addition, the pressure range over which venting occurs increases. This means that while reduced remaining thickness can reduce the pressure at which the cell vents, it increases the uncertainty as to exactly when the venting will occur. It will occur at some pressure over a fairly wide pressure range. Obviously, any technique which can tighten the pressure range over which venting will occur improves the consistency of operation.

Figure 4:
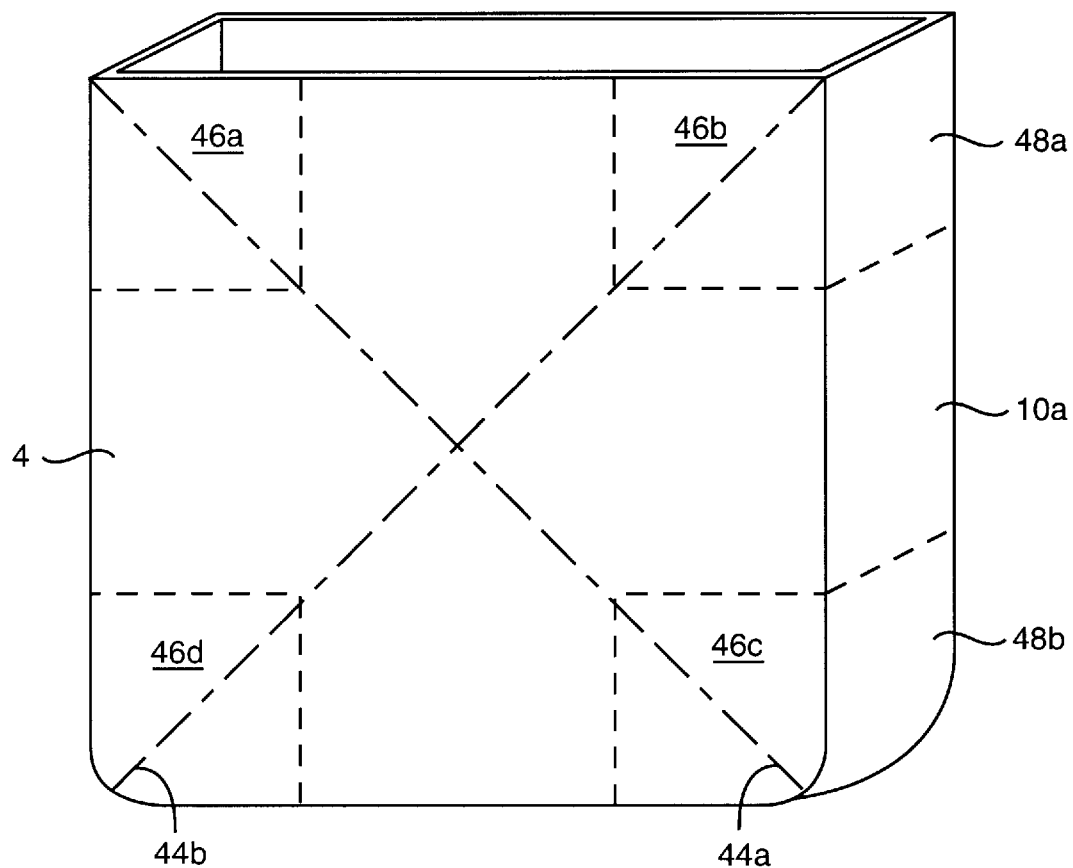
FIG. 4 illustrates the corner regions of a principal side of a prismatic cell can where scoring is preferably applied in accordance with an embodiment of this invention.

FIG. 4 illustrates preferred locations for scored regions on prismatic cell can 4. It has been found that as pressure increases within a prismatic cell, the prismatic cell can begin expanding to assume a pillow shape. During this expansion, much of the bending occurs along the diagonals bisecting the principal sides of the can. And along those diagonals, the most significant bending occurs near the corner regions.

As illustrated in FIG. 4, principal side 8a of prismatic cell can 4 is bisected by diagonals 44a and 44b. Preferably, one or more scored regions is provided along the diagonals. More preferably, the scored region or regions is provided in one of the "corner regions" (46a, 46b, 46c and 46d) shown on side 8a. Preferably, a corner region encompasses a region between the end of one of the diagonals (a far corner on the principal surface) and a point about 30% of the way between that end and the other end of the diagonal. Preferably, the exact location of the scored region will be at or near the position where maximum bending occurs when excess internal pressure builds up within the cell.

In some embodiments, the scored region may be provided along one of the secondary sides of the prismatic cell can. For example, the scored region may be provided on either surface 10a or 10b of prismatic cell can 4. When this is the case, the scored region or regions are preferably located near the top or bottom of the secondary side (i.e., near one of the ends of the longer axis of the secondary side). As shown in FIG. 4, these preferred locations correspond to a top region 48a and a bottom region 48b of secondary side 10a. Again, the choice of this location is based upon where maximum bending occurs on excess internal pressurization.

Sometimes the proximity to an available pathway for gas pressure to escape will influence the selection of a location of a cell vent. If there are two similar locations for the scoring but one of these location is located at a position where gas is likely to accumulate or migrate to, it may be selected. For example, if the interior of the prismatic cell can includes a void space, the scored region may preferably be provided over that void space.

Figure 5:
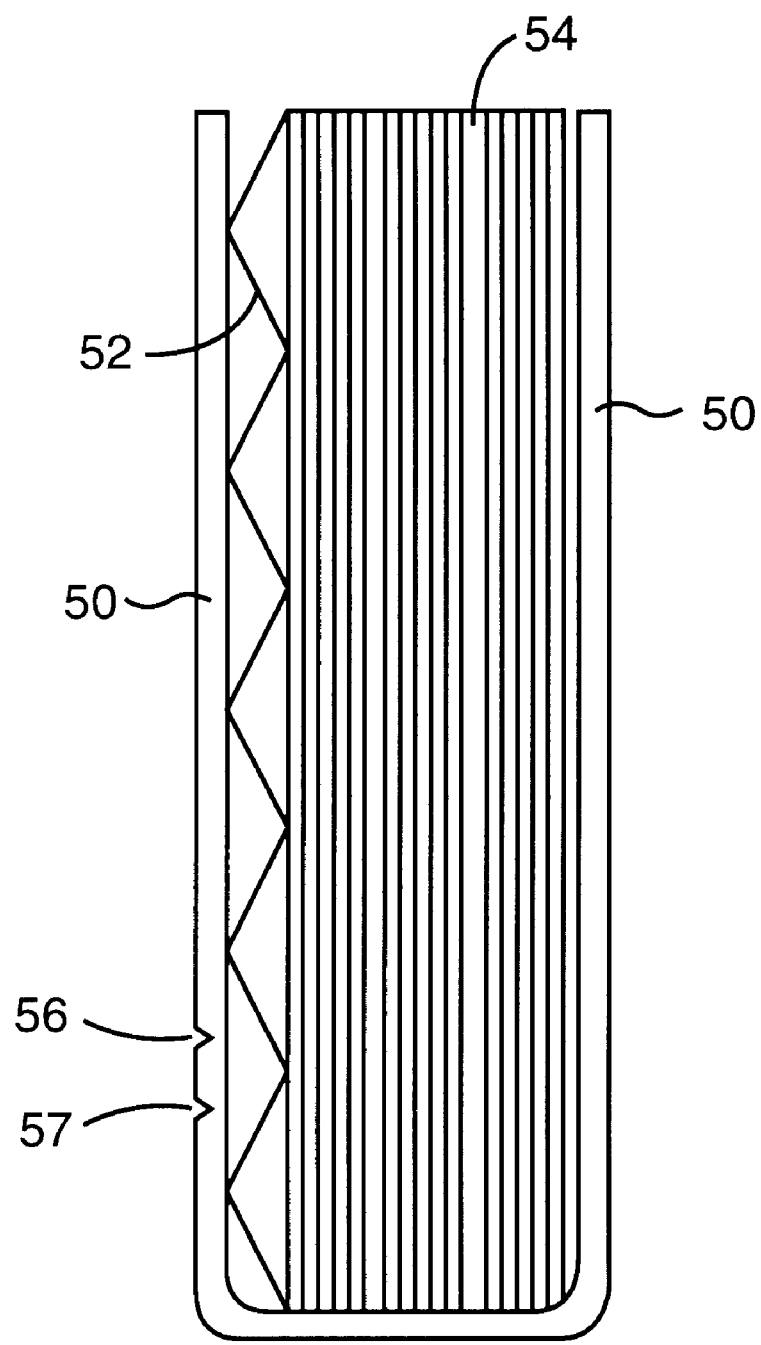
FIG. 5 depicts a cross section of a prismatic cell can including a spring adjacent to a principal surface where a scored region resides.

One example of a prismatic cell having such a void space is illustrated in FIG. 5. As shown there, a side cross section of the completely fabricated prismatic cell includes a principal side wall 50 which contacts a spring 52 designed to separate a jellyroll 54 from the side wall. Spring 52 serves to provide compressive force to the jellyroll stack, maintaining intimate contact between the anode and cathode layers as well as providing electrical connection between the jellyroll and the can. Principal side wall 50 includes a scored region 56. Typically, a spring such as spring 52 is provided along only one of the two principal surfaces of a rectangular prismatic cell. In such designs, it is desirable to include the scored region on the principal side that contacts the spring as shown in FIG. 5. Again, this is because excess gas tends to accumulate in the void or voids defined by the spring.

Figure 6:
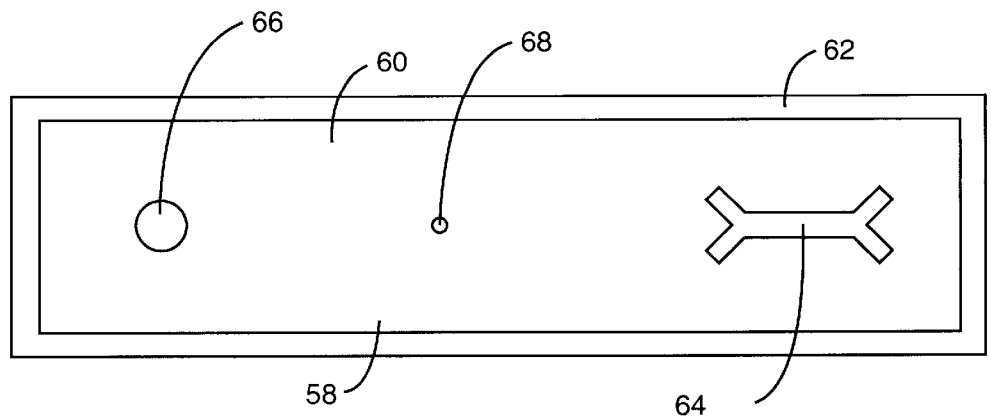
FIG. 6 shows a prismatic cell header in top view having a scored region located proximate one end of the header in accordance with a preferred embodiment of this invention.

FIG. 6 illustrates a top view of a prismatic cell header 58. Header 58 includes a substantially flat body region 60 surrounded by a lip 62 in accordance with the present invention. It also includes a dog bone-type scored region 64 proximate one end of body portion 60. Note that it is preferable to place the scored region at a region where significant deformation occurs on pressurization. As will be illustrated below, this may be near the middle of flat body region 60 or near one of the ends of the header. If the scored region is near one of the header ends, preferably it is separated from a header end by no less than about 25% of the distance between the ends of the header. Other features of prismatic header 58 include a terminal port 66 and an electrolyte fill hole 68.

Figure 7A:
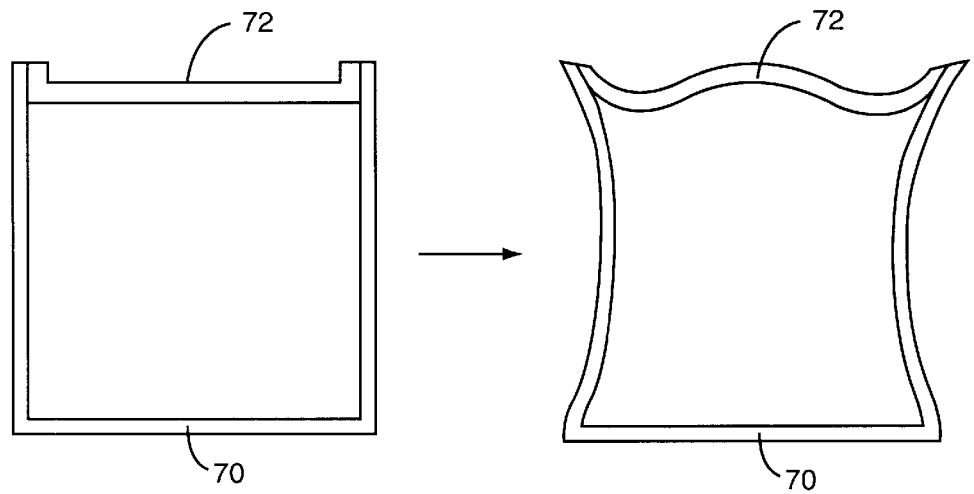
FIG. 7A illustrates the deformation experienced by a prismatic cell can under excess internal pressure (viewed through a plane parallel to a principal surface).
Figure 7B:
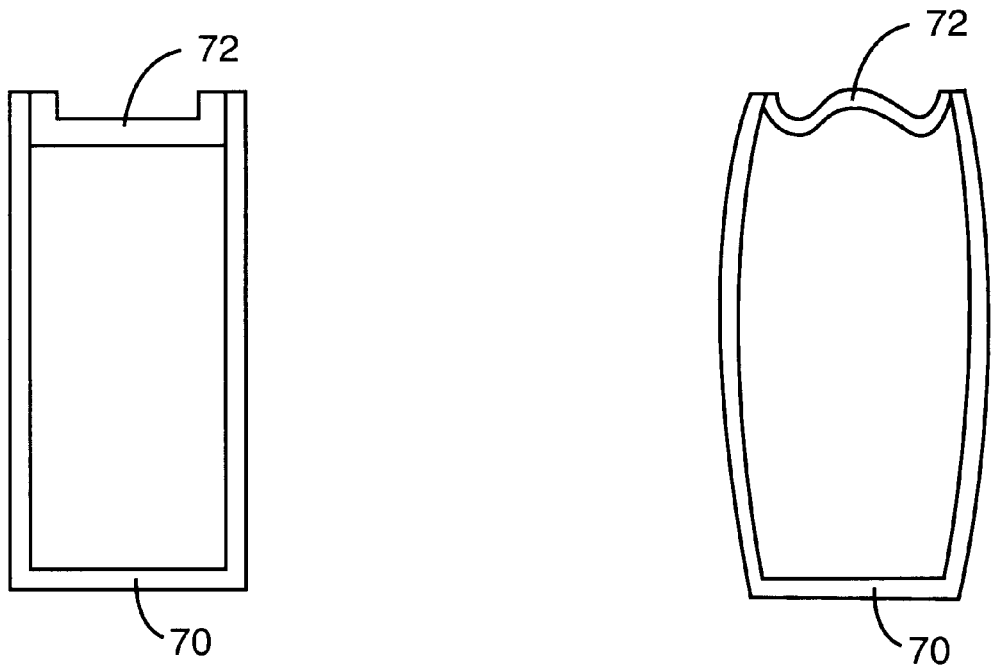
FIG. 7B illustrates the deformation that a prismatic cell can undergoes when exposed to excess internal pressure (viewed through a plane parallel to a secondary surface).

An advantage of using a dished prismatic cell header (as opposed to a simple flat header as used in the Sony prismatic cell described above) is illustrated in FIGS. 7A and 7B. FIG. 7A shows a cross section of a prismatic cell of this invention viewed through a plane parallel to a principal side. The cross section is taken midway between the principal surfaces. FIG. 7B shows a cross section through the same prismatic cell but through a plane parallel to a secondary side. This cross section is taken very near to one of the secondary sides, close to an end of the dished header. The left hand structures shown in FIG. 7A and 7B represent the prismatic cell before excess internal pressure builds up. To the right of the structures (in the direction of the arrow) are illustrations representing the deformation of the prismatic cell under excess internal pressure.

As expected intuitively, a can portion 70 bows outwardly along each of its principal sides as illustrated in FIG. 7B. Surprisingly, the outward bow of the principal sides causes an inward bow of the secondary sides as illustrated in FIG. 7A; the magnitude of the inward bow is dependent on the size of the secondary sides and the corner radius at the intersection of the principal and secondary sides. As the secondary sides and intersecting radii get smaller, the greater the magnitude of the internal bow. Only at very high pressures will the secondary sides bow outwardly. The associated bending is sharpest at the corners where two adjacent sides contact one another.

When the dished header portion 72 is viewed through a plane parallel to a principal side of can 70 (FIG. 7A), the bow is slightly inward near the ends adjacent to the secondary sides, and significantly outward throughout the remainder. Note that in flat headers, for an equivalent material thickness and internal pressure, the deformation is inward similar to that at the secondary sides in FIG. 7A. Only at much higher pressures is the outward bow in the center observed. For this reason, prismatic cell scoring is preferably provided in regions proximate the intersection of the opposite bowing regions of the header. As noted, in other designs employing non-dished designs, the outward bowing illustrated in FIG. 7B does not occur initially on pressurization. For this reason, the dished header design employed with the present invention provides superior safety characteristics.

The indentations provided by the scoring may be provided on either the interior or exterior surface of the prismatic cell can or the prismatic cell header. Preferably, the scoring indentations are provided on the outward side of the bowing. For example, if the scoring is provided near the edge of prismatic cell header 72 (i.e., adjacent the secondary side of can 70), the scoring is preferably provided on the top surface of the header. Alternatively, if the scoring is provided near the center of prismatic cell header 72, the indentations are preferably provided on the bottom of the header. The difference in direction of the scoring indentation is a reflection of the different bowing directions occurring on header 72 during excess internal pressure. With respect to prismatic cell can 70, the scoring indentations are preferably provided on the exterior surface. This is a reflection of the fact that all bowing on the circumferential side walls of the prismatic cell can is directed outward.

As mentioned, the prismatic cell containers of this invention can be constructed from any number of suitable materials. Those of skill in the art will recognize the required properties of the material. For example, it should be impervious to and chemically resistant to the other cell components at operating cell potentials. If a metal is chosen, it is preferable a steel, a stainless steel, aluminum, or an aluminum alloy. A corrosion resistant plating, (such as a nickel plating) may also be employed. In preferred embodiments employing plated materials, a pre-plated metal is used for the processing. In other words, all processing of the container including forming the scoring is performed on the plated material. In some alternative embodiments, the plating may be performed after the scoring step. This might be advantageous if the scoring operation is sufficiently aggressive that it cuts through the plating to expose the underlying material.

The scored vent regions of this invention should have a burst pressure that is significantly below the pressure at which an explosion or fire can occur. For nonaqueous lithium ion batteries, this pressure is preferably between about 200 and 600 psi, more preferably between about 400 and 600 psi. The scoring characteristics necessary to allow a controlled venting at these pressures depend in large part upon the type of material used to construct the prismatic cell container. For some steels, it has been found that the remaining thickness in the scored region should preferably be between about 4% and 30% of the unscored material thickness. More preferably, the remaining thickness is between about 4% and 25% of the unscored material thickness, and most preferably between about 7% and 15% of the unscored material thickness.

The amount of prismatic cell container surface area occupied by the scored region should be relatively limited. If it is too large, it will leak too much material from the interior of the prismatic cell during controlled venting. Preferably, the area occupied by the scored region does not constitute more than about 30% of the entire header body portion or any one of the circumferential side walls. More preferably, the scored region area does not constitute more than 20% (most preferably not more than about 10%) of the header body portion or any one of the circumferential side walls. In one specific embodiment employing a rectangular prismatic cell of dimensions 34 mm×9 mm×48 mm (1.3 inches×0.35 inches×1.9 inches), a scored region on a principal side of the cell can does not occupy more than about 0.75 square inches. The same size scoring may be used on the cell header.

The surface area occupied by the scoring is a function of its shape and linear dimensions. Another characteristic of the scoring is the width of the lines comprising the scoring. While the invention is not limited to any particular scoring width, it has been found that a scoring line width is between about 0.1 and 0.3 millimeters works well. More preferably, the line width is between about 0.15 and 0.25 millimeters.

The scored regions used in the prismatic cell containers of the present invention may be created by any of a number of methods. For example, a press with a tool in a shape of the scored region can stamp the scoring onto the cell container. In the case of a prismatic cell can, a transfer press is normally employed to bend, draw, and ultimately form the cell can from a flat piece of metal. Typically, the can is formed from the metal in a series of steps using different mandrels and other tools which act on the metal as it is conveyed along the transfer press. In a preferred embodiment, the transfer press includes a side action tool for stamping the score region onto the can while it still rides in the transfer press. Alternatively, the completed prismatic cell can may be provided on a separate mandrel where a press with a scoring tool applies the scoring.

Typically, a prismatic cell header is not formed on a transfer press. The dished headers of this invention may be formed by using a progressive die which feeds a continuous metal strip through a track where it is stamped at various stages before being cut to form the individual headers. In a preferred embodiment, the scoring is performed on the metal strip together with the other stamping operations which create the necessary contours of the prismatic cell headers.

Of course, the scoring regions employed in the present invention may be generated by other mechanical and non-mechanical means. For example, scoring can be produced by chemically etching the prismatic cell container material, laser ablating the material, or any other technique which selectively removes some material from the container surface.

The prismatic cell containers of this invention are ultimately used to form completed batteries. As mentioned, the prismatic cell containers of this invention may be employed with many different battery types (chemistries) including lithium ion batteries. Generally, a prismatic lithium ion cell of this invention will include (1) a cell container (including the prismatic can and header as described above), (2) a cathode (typically a metal oxide such as $LiCoO_2$) capable of reversibly inserting lithium ions on discharge and releasing lithium ions on charge, (3) an intercalation anode (typically carbon) capable of reversibly taking up lithium ions on charge and releasing lithium ions on discharge, (4) an electrolyte conductive to lithium ions, and (5) a mechanical separator between the anode and cathode.

The following examples serve to illustrate the effectiveness of the present invention. From experimentation with a round score 0.300 inch in diameter on a steel can wall (34 mm×9 mm×48 mm) with a wall thickness of 0.016 inches, the following results were obtained:

| Remaining Can thickness (Approx. in.) | Ave. Vent Pressure (psi) | Standard Deviation | Number of Samples |
| --- | --- | --- | --- |
| .0025 | 279 | 8.5 | 10 |
| .0040 | 276 | 10.5 | 10 |
| .0055 | 345 | 12.3 | 10 |
| .0060 | 493 | 50 | 10 |

The results show that a fairly large range in remaining score thickness gives a relatively tight range of vent pressures.

Other pressure tests (from other sources) have shown that a score thickness on the bottom of a steel prismatic can with a wall thickness of 0.016 inches must be about 0.0015 to 0.0025 thick to obtain vent pressures below 500 psi. When 0.016 thick steel is stamped to a remaining thickness of 0.0015 to 0.0025, very careful steps must be taken to keep cracks in the metal from occurring.

We have found that a score with a remaining thickness of 0.0025 to 0.004 in. in a 0.016 in. thick can wall is easily attainable without cracking using standard scoring methods. Also, since a fairly large range in remaining can thickness produces the same vent pressure, the vent pressure will be very minimally affected by tool wear and thus precision of the score depth.

Though the shape of the score in the above test is round, scores of different shapes and similar sizes are expected to give similar vent pressures. Some alternative shapes are shown in FIGS. 3A through 3H, described above.

Additional tests were conducted on flat and dished steel headers. These tests employed two different score configurations: a circle shaped score and a dog bone shaped score. FIG. 8A presents the venting pressures obtained with the dog bone scoring. Note that "score thickness" in this figure (and FIG. 8B) refers to the remaining material thickness in the score region.

As expected, sets 1 and 2 have higher burst pressures than 4 and 5. Note that all the flat headers above were tested with the score-sides up, except for one sample from set 1 which was tested with the score-side down. The burst pressure from that sample was 1350 psi.

We have also found that placing a score on carbon steel will further reduce the burst pressure for a given thickness as shown in the table presented in FIG. 8B. When carbon steel is used, it may need to be plated with a corrosion resistant material such as nickel.

Although the foregoing invention has been described in some detail for purposes of clarity of understanding, it will be apparent that certain changes and modifications may be practiced within the scope of the appended claims. For instance, although the specification has described primarily lithium ion cells as the beneficiaries of the present invention, there is in principle no reason why the invention can not be employed in other cell types, including those employing either liquid or solid electrolytes. Further, while the specification has described a prismatic cell design, there is in principle no reason why some aspects of the invention could not be applied to a cylindrical or other cell designs. Therefore, the present embodiments are to be considered as illustrative and not restrictive, and the invention is not to be limited to the details given herein, but may be modified within the scope of the appended claims.

What is claimed is:

1. A prismatic cell can comprising:
   a cell can body including a bottom portion and a circumferential side portion; and
   a scored region of reduced material thickness on the circumferential side portion of the cell can body.

2. The prismatic cell can of claim 1, wherein the circumferential side portion is rectangular, having two substantially flat principal sides parallel to one another and having two secondary sides parallel to one another.

3. The prismatic cell can of claim 2, wherein the scored region is proximate a corner of one of the principal sides.

4. The prismatic cell can of claim 1, wherein the cell can body includes multiple scored regions.

5. The prismatic cell can of claim 1, wherein the circumferential side portion is oval shaped.

6. The prismatic cell can of claim 1, wherein the cell can body is made from at least one of steel, stainless steel, aluminum, and an aluminum alloy.

7. The prismatic cell can of claim 1, wherein the cell can body is made from a metal having a corrosion resistant plating.

8. The prismatic cell can of claim 1, wherein the scored region is circular in shape.

9. The prismatic cell can of claim 1, wherein the scored region is dog bone shaped.

10. The prismatic cell can of claim 1, wherein said scored region is located on a secondary side of said circumferential side portion.

11. The prismatic cell can of claim 1, wherein said scored region is located on said circumferential side portion adjacent a void space in the interior of said cell can.

12. The prismatic cell can of claim 1, wherein the circumferential side portion includes at least one substantially rectangular flat side having a plurality of corners;
   further wherein said flat side includes a diagonal connecting two of said corners; and
   further wherein the scored region is located on said diagonal at a point about 30% of the length of said diagonal from one of said corners of said principal side.

13. The prismatic cell can of claim 12, wherein the scored region has a remaining thickness of between about 7% and 15%.

14. The prismatic cell can of claim 13, wherein the scored region has a scoring width of between about 0.1 millimeters and 0.3 millimeters.

15. The prismatic cell can of claim 1, wherein the circumferential side portion includes at least one substantially rectangular flat side having a plurality of corners;

further wherein said flat side includes a diagonal connecting two of said corners; and further wherein the scored region is located on said diagonal approximately at a point where maximum bending occurs when excess internal pressure builds up within said cell can.

16. A method of venting a prismatic battery having at least one of a cell can including a bottom portion and a circumferential side portion having at least one substantially rectangular flat side having a plurality of corners;

wherein said flat side includes a diagonal connecting two of said corners; and further wherein said flat side includes a scored region located on said diagonal, the method comprising:

exposing the prismatic battery to conditions whereby pressure within the prismatic cell container reaches a predefined burst pressure; and releasing some of said pressure by rupturing the scoring on the cell can.

17. The method of claim 16, wherein the predefined burst pressure is at least about 200 psi.

18. The method of claim 16 wherein the scored region is located at a point about 30% of the length of said diagonal from one of said corners of said principal side.

19. The method of claim 16 wherein the scored region is located on said diagonal approximately at a point where maximum bending occurs when excess internal pressure builds up within said cell can.

* * * * *